WYTHE F. WALKER
CHARLES W. DEMAREST
INVENTORS.

BY Gordon H. Olson

ATTORNEY

United States Patent Office 3,405,758
Patented Oct. 15, 1968

3,405,758
AIR MIXING APPARATUS WITH AUXILIARY AIR OUTLET
Wythe F. Walker, Long Beach, and Charles W. Demarest, Gardena, Calif., assignors to International Telephone and Telegraph Corporation, New York, N.Y., a corporation of Maryland
Filed Mar. 16, 1966, Ser. No. 534,803
3 Claims. (Cl. 165—16)

ABSTRACT OF THE DISCLOSURE

A system for controlling the flow of fresh air and return air into and out of a duct. Air is drawn from a fresh air inlet inlet and from a return air outlet by a blower. Dampers adjust the inlet and outlet openings. An auxiliary return air outlet is covered by a gravity operated damper. Thus, when the return air inlet damper is closed, fresh air may be circulated throughout the system and exhausted. Otherwise, fresh air and return air may be mixed in varying proportions, and little or no return air may be exhausted, if desired. Further, when the fresh air inlet is closed, return air may be circulated exclusively in the system.

---

This invention relates to equipment for conditioning or treating air, and more particularly to an improved arrangement for mixing return air with fresh air to obtain uniform temperature across the air outlet in a large multi-zone air conditioning unit.

One type of commercial air treating equipment is designed as a large integral unit including air heating means, air cooling means, and appropriate air inlet and outlet connections. The inlet connections usually include an opening to the outside for drawing in fresh air, an exhaust fan connected to draw stale air from the building being treated, and a return air duct for cycling building air back into the system. The air outlet means typically comprises a series of duct connected to the various locations within the building. During a common operation of the system, a portion of the return air is cycled back into the system while a certain amount of fresh air is also provided to furnish proper ventilation and replenish air lost in the system. Since the return air is usually at a different temperature than that of the outside air, it is desirable that the return air be properly mixed with the fresh air so that the combined inlet air temperature is uniform and the various outlet ducts receive air of approximately the same temperature when calling for the same condition.

In known prior art arrangements having large inlet and outlet ducts there has been no provision for the insured mixing of return and fresh air with the result that stratification occurs, causing the outlet air to be at different temperatures.

It is a primary object of this invention to provide an improved air conditioning system having a unique arrangement for properly mixing return air and fresh air.

It is a further object of this invention to provide such an improved system in a simple and direct manner so as to provide trouble-free operation and to minimize the cost of the equipment.

In accordance with the invention, the air conditioning system includes an elongated hollow housing having a rectangular cross-section with a relatively wide, horizontal dimension. For convenience in describing the structure and mode of operation of the system, it is helpful to think of the housing as divided into a plurality of interconnected auxiliary chambers including a mixing chamber, a return air inlet-exhaust chamber, and an air conditioning-discharge chamber. Air moving equipment is positioned within the housing between air inlet means located at one end of the housing with outlet means positioned at the other end. Normally, such a system also includes means downstream from the air moving equipment for varying the temperature of the air passing therethrough although the present invention is applicable to a system which merely circulates air also. The air inlet means includes the return air inlet-exhaust chamber and an opening in a wall of the housing adjacent the end of the housing for introducing outside air directly into the mixing chamber positioned within the housing opposite the outside air inlet. The return air inlet into the housing is located adjacent the outside air inlet, such as through the bottom wall of the housing when the system is placed on the roof of a building, and opens into the return air inlet-exhaust chamber which is adjacent the mixing chamber.

To prevent stratification of the return air and the outside air as they pass through the housing, air directing means in the form of a damper is mounted adjacent the return air inlet so that the return air passing through the damper from the return air inlet-exhaust chamber is directed towards the fresh air inlet. With such an arrangement, the fresh air passing into the mixing chamber from outside the housing strikes the return air admitted to the mixing chamber from the return air inlet-exhaust chamber, causing a violent mixing or turbulent action with the result that the air then passing through the housing has substantially the same temperature across the width of the housing. Consequently, if two different areas of the building are both calling for heat, the air reaching these areas should essentially be the same temperature.

With the system described, an exhaust fan may also be mounted in the end of the housing formed by the return air inlet-exhaust chamber, the air intake for which is in communication with the return air duct. Thus, the damper between the return air inlet-exhaust chamber and mixing chamber and a similar damper across the fresh air inlet communicating directly with the interior of the mixing chamber working in unison uniquely provide the necessary control for the entire unit.

Further features and attendant advantages of this invention will become apparent with reference to the following drawings, in which.

Figure 1:
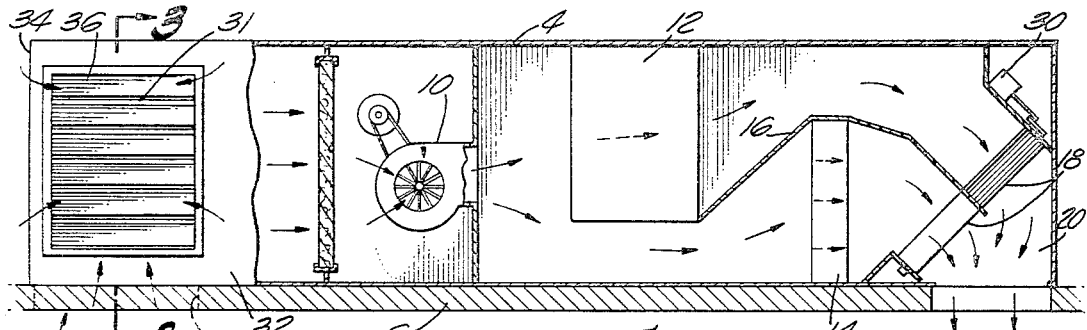
FIG. 1 is a side elevational, partially sectionalized view of a heating system incorporating the teachings of the invention.

For a more detailed description of the invention, reference is made to the drawings wherein there is schematically shown an air conditioning unit mounted on the roof 6 of a building. As can be seen, the unit is positioned within a large housing 4 having a rectangular cross-section and having a considerable horizontal dimension. As seen by the arrows in FIGS. 1 and 2, the air flow through the system is generally from left to right such that air is drawn into the housing (through air inlet means, to be later described) by a pair of blowers 10 which extend essentially across the entire width of the housing. Although only two blowers are illustrated, it should be understood more may be mounted in similar fashion if desired.

The upper portion of the air flow is forced through a heating unit 12 while the lower portion flows through a cooling unit 14. The heating and cooling units may be of any suitable form although the cooling medium within the cooling unit is typically provided by a compressor (not shown) normally mounted adjacent the main housing 4. It should be noted that both the heating and cooling units extend across the width of the housing.

Figure 2:
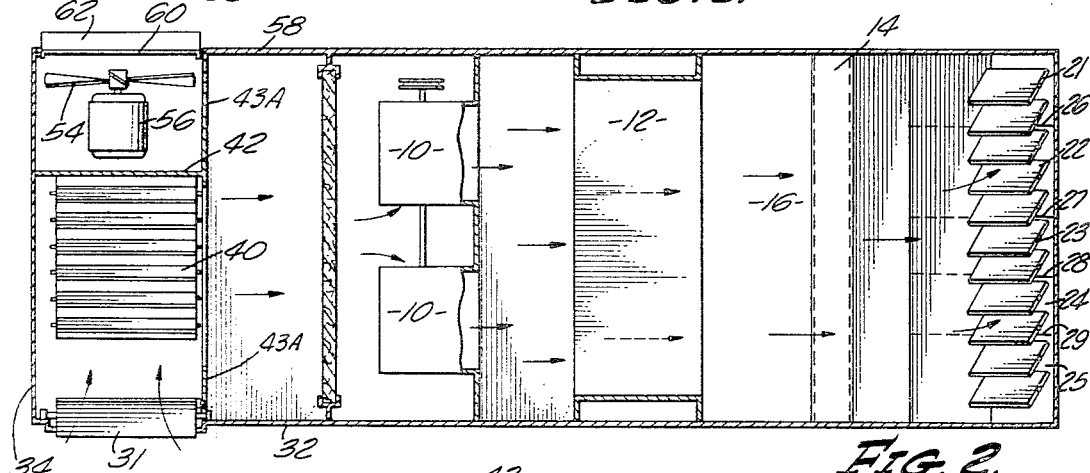
FIG. 2 is a plan, sectional view of the system of FIG. 1.

The air is divided by a horizontally extending, separating wall 16 which continues past the cooling unit 14 and terminates at the midpoint of a damper unit 18 which defines the entrance to a duct unit 20 which extends across the entire width of the housing 4, and is, of course, connected directly to various rooms or areas within the building. The ducts are shown in FIG. 1 as extending downwardly through the roof 6 of the building; however, these ducts may be connected out through the end wall of the housing instead, if desired.

In the arrangement shown, the duct unit 20 includes five different side-by-side outlet ducts 21 through 25 as defined by duct walls 26–29. These ducts may be of the same size or different sizes as desired, and it should be understood that any number of ducts may be employed depending upon the size and air flow characteristics of the system. These ducts extend both above and below the separating wall 16, but the dampers controlling the entry to the upper and lower portions are individually adjustable as are the dampers between adjacent ducts. An example of one such damper adjusting or actuating means is shown at 30. With such an arrangement, each duct 21–25 can have either cool or warm air as desired and one duct may receive cool air while an adjacent duct may receive warm air if such demand is required.

Turning now to the inlet end of the housing, there is provided a fresh air inlet port 31 in the front side of the wall 32 adjacent the end housing wall 34. An adjustable damper mechanism 36 is mounted within the fresh air inlet port 31 to control the air intake.

A return air duct 38 is shown extending upwardly through the building and through the bottom wall 39 of the housing into the return air inlet-exhaust chamber 39A. In accordance with the invention, there is positioned above the return air duct a damper unit 40 mounted at an acute angle with respect to the horizontal bottom wall. That is, when viewed as in FIG. 3, the lower right hand edge of the damper engages a short vertical wall 41 joining the bottom wall of the housing while the left end of the damper is supported adjacent a vertically extending wall 42 which closes the space between the left end of the damper and the top wall 43 of the housing. The wall portions 41–42 and return air inlet damper 40 thus define one wall of the return air inlet-exhaust chamber 39A, the remaining walls of which are provided by the top, bottom, and end wall of the housing and a transverse wall 43A shown best in FIGS. 2 and 3, and having a port 43B communicating the mixing chamber 44 with the interior of the housing ahead of the blower 10. With such an arrangement, the damper 40, when open, directs the return air towards the fresh air inlet 31 to cause a turbulent mixing action in the mixing chamber 44 defined by the dampers, the end and top walls of the housing and the vertical wall 42. This mixing action causes the air being drawn through port 43B by the blowers 10 to be essentially of uniform temperature with the result that the temperature at the outlet duct unit 20 should also be at essentially a uniform temperature, except as changed by the heating or cooling means.

To automatically provide the desired proportioning of fresh air to return air, the dampers 36 and 40 are operated by a single damper actuating means 46 having suitable mechanical connections 48 and 50 connected to the respective dampers in a manner such that one damper closes as the other opens. Hence, the desired air flow is automatically maintained by the single actuating means 46.

In a typical operation of the air conditioning unit of the invention, the fresh air damper 36 is probably closed early in the morning while the return air damper is completely open and the heating unit 12 may be in operation. As the building begins to warm and the number of people within the building increases, it may be desirable to introduce fresh air into the system. As explained, by energizing the damper actuating mechanism 46, the fresh air damper 36 is opened and simultaneously the return air damper 40 is closed a similar amount. The desired proportion of fresh air to return air is thus easily attained.

Figure 3:
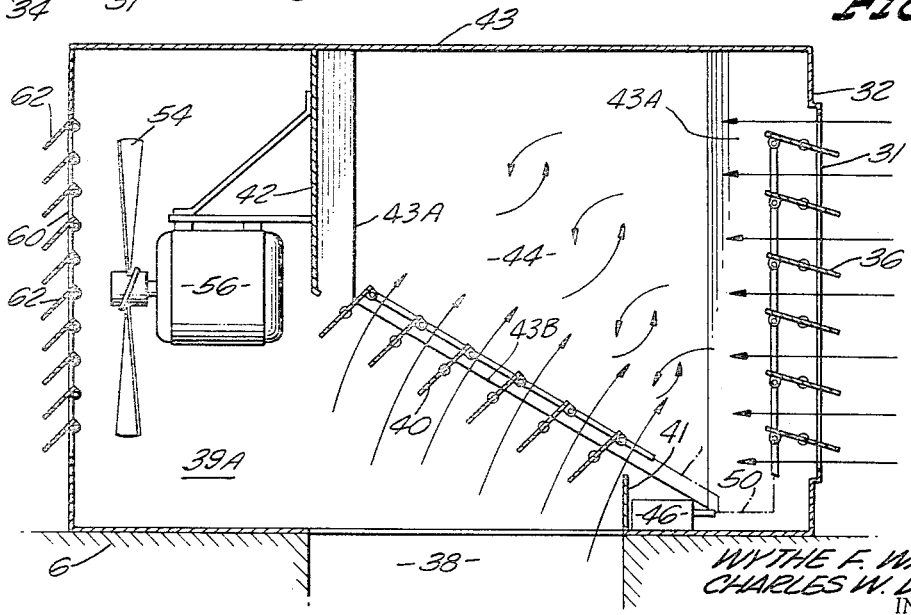
FIG. 3 is a sectional view of the system showing the air intake and the exhaust fan, along line 3—3.

The air conditioning unit of the invention is also provided with an exhaust fan 54 for rapidly changing air in the building. It is driven by a motor 56 and mounted adjacent an opening 60 in side wall 58 adjacent end wall 34 directly opposite from the air inlet opening 31. As seen in FIG. 3, the opening 60 is in direct communication with return air inlet-exhaust chamber 39A and therethrough with return air duct 38 upstream of damper 40 so that air may be exhausted from the system. The opening 60 is controlled by a one-way gravity operated damper unit 62, which allows air to flow only out of the system. The fan 54 is, of course, not normally operated unless the damper 40 is closed. With such arrangement, the exhaust fan can remain open to the return air duct at all times and the damper mechanism 40 serves as a control valve for both the exhaust fan and the return air flow. In other words, when the damper 40 is closed and the fan is on, the fan blows air out of the chamber 39A through the damper 62. This has the effect of creating a low pressure in chamber 39A, which draws return air through the return air inlet duct 38. On the other hand, with damper 40 closed and the fan not operating, the blowers 10 draw fresh air into the mixing chamber through open damper 36. In this arrangement, even with the fan inoperative, the return air is exhausted from chamber 39A by the static pressure developed in the system by the blowers.

While a particular preferred example of the invention has been described and illustrated, it is intended that all variations and modifications that fall within the true spirit and scope of the invention will be included in the appended claims.

What is claimed is:
1. In an air conditioning system:
   an elongated housing having a rectangular cross-section defined by top, bottom and side walls;
   a fresh air inlet located in a side wall of the housing adjacent one end of the housing;
   a return air inlet located in the bottom wall of the housing near the fresh air inlet;
   blower means positioned within the housing for drawing air into the housing;
   an exhaust air outlet located adjacent said one end of the housing but opposite the fresh air inlet;
   means defining a mixing chamber adjacent the fresh air and return air inlets;
   damper means mounted at an acute angle with respect to the bottom wall adjacent the return air inlet to direct air into the mixing chamber toward the fresh air inlet so that the return air will thoroughly mix with fresh air when both fresh air and return air are admitted to the mixing chamber;
   said exhaust air outlet being located on the side of the damper means remote from the fresh air inlet so that return air will be exhausted through the exhaust air outlet when the damper means is closed;
   an exhaust fan within the housing positioned to draw air from the return air inlet when the damper means adjacent the return air inlet is closed;
   an exhaust damper in the air path of the exhaust fan permitting air flow out of the housing but precluding air flow into the housing;
   means within the housing for heating a portion of the air passing through the housing; and
   outlet damper means for controlling the proportion of heated air to unheated air passing through the housing.

2. The combination as defined in claim 1, in which said exhaust damper means is normally closed by gravity and is positioned in the exhaust air outlet.

3. The combination according to claim 1, in which the fresh air inlet is provided with a damper mechanism operable in conjunction with the damper means adjacent the return air inlet so that one of said dampers is opened to the extent the other is closed and conversely.

References Cited

UNITED STATES PATENTS

| | | | |
|---|---|---|---|
| 2,327,664 | 8/1943 | Otis | 98—38 XR |
| 2,131,725 | 10/1938 | Chester | 98—38 |
| 2,819,023 | 1/1958 | Marshall | 98—38 XR |
| 2,854,915 | 10/1958 | Carr | 98—38 |
| 1,840,565 | 1/1932 | Buensod | 165—16 X |
| 2,892,324 | 6/1959 | Quick | 165—16 X |
| 2,963,956 | 12/1960 | Hill | 98—116 |
| 3,217,790 | 11/1965 | Wasson et al. | 165—16 |

ROBERT A. O'LEARY, *Primary Examiner.*

M. A. ANTONAKAS, *Assistant Examiner.*